United States Patent [19]

Laskowski et al.

[11] Patent Number: 4,559,858
[45] Date of Patent: Dec. 24, 1985

[54] PORTABLE BAND SAW SAW MILL APPARATUS

[75] Inventors: Donald R. Laskowski, Indianapolis; Daniel R. Tekulve, Batesville, both of Ind.

[73] Assignee: Laskowski Enterprises, Incorporated, Indianapolis, Ind.

[21] Appl. No.: 451,100

[22] Filed: Dec. 20, 1982

[51] Int. Cl.⁴ .......................................... B23D 55/08
[52] U.S. Cl. ...................................... 83/801; 83/574; 83/743; 83/794
[58] Field of Search ................. 83/574, 795, 801, 809, 83/798, 811, 745; 30/382

[56] References Cited

U.S. PATENT DOCUMENTS

| | | | |
|---|---|---|---|
| 1,576,051 | 3/1926 | Jull | 83/811 X |
| 2,555,056 | 5/1951 | Pence | 83/798 |
| 3,695,316 | 10/1972 | Pluckhahn | 143/32 Q |
| 3,926,086 | 12/1975 | Crane | 83/801 |
| 3,952,622 | 4/1976 | Majus | 83/811 |
| 4,122,604 | 10/1978 | Brown | 83/745 |
| 4,214,498 | 7/1980 | Zukas et al. | 83/574 |
| 4,235,140 | 11/1980 | Reece | 83/794 |
| 4,244,104 | 1/1981 | Grube | 83/745 X |
| 4,245,535 | 1/1981 | Lockwood et al. | 83/795 X |
| 4,275,632 | 6/1981 | Ross | 83/574 |
| 4,300,428 | 11/1981 | Woodland | 83/574 |
| 4,307,641 | 12/1981 | Shapleigh | 83/574 |
| 4,320,679 | 3/1982 | Trudeau | 83/574 |
| 4,328,617 | 5/1982 | Satoh | 30/382 |

Primary Examiner—Donald R. Schran
Assistant Examiner—James Wolfe
Attorney, Agent, or Firm—Barnes & Thornburg

[57] ABSTRACT

A portable saw mill apparatus includes a frame carrying supporting wheels, outriggers and a trailer hitch. A horizontal, unitized tubular track is secured to the frame and a carriage is moveable along said track. Mounted on the carriage is a horizontal, cantilevered band saw which is moveable vertically. Logs are received on support members secured to the frame, and the band saw is moved longitudinally of the frame to make successive cuts of the saw. Lowering of the band saw between successive passes provides for spacing of the cuts of the log. A single lever control enables the operator to positively engage or brake the band saw, and also to control the engine throttle.

19 Claims, 5 Drawing Figures

PORTABLE BAND SAW SAW MILL APPARATUS

BACKGROUND OF THE INVENTION

1. Field of the Invention

This invention relates generally to saw mills and more particularly is directed towards a new and improved portable saw mill.

2. Description of the Prior Art

A conventional saw mill typically utilizes a moveable carriage assembly which traverses the length of an elongated bed. Said carriage assembly typically incorporates a large circular saw blade or band saw blade which saws the log as the carriage moves the length of the bed. Installation of said saw mills usually requires long set-up prior to operation. Such mills also normally utilize gravity feed which produces uncontrolled feed rate and results in a lack of maximum cutting performance. These saw mills typically lack positive saw blade stoppage between cuts which introduces safety hazard. Typically such mills require the log to be shifted to a new position for each cut of the log which wastes time and effort. In such cases, it is desirable that a portable mill of maximum safety be available that can be set up rapidly, have a controlled feed rate, a positive saw blade brake, and a design which eliminates the need to shift the log between each cut.

SUMMARY OF THE INVENTION

This invention features a portable saw mill comprising a rigid base in the form of a unitized tubular track and a minimum of two stationary log supports upon which the log is placed. A cantilevered carriage mates to and traverses the length of the unitized tubular track by means of a mechanically controlled feed. The carriage incorporates a horizontal band saw which can be raised and lowered mechanically and is driven by a low H.P. engine which is controlled by a single levered clutch, brake, and throttle mechanism. Adjustable holding means and/or the weight of the log secure the log into cutting position. In the most portable form, an axle with wheels, outriggers and removable log ramps are affixed to the base to provide minimum set-up from one job site to the next. This trailer assembly also allows dual use as a means for hauling cut lumber.

Accordingly, it is the object of the present invention to provide improvements in portable saw mills. Another object of this invention is to provide a portable saw mill of simple operation having rapid set up and yielding maximum cutting performance with minimum effort and cost.

DESCRIPTION OF THE PREFERRED EMBODIMENT

Figure 1:
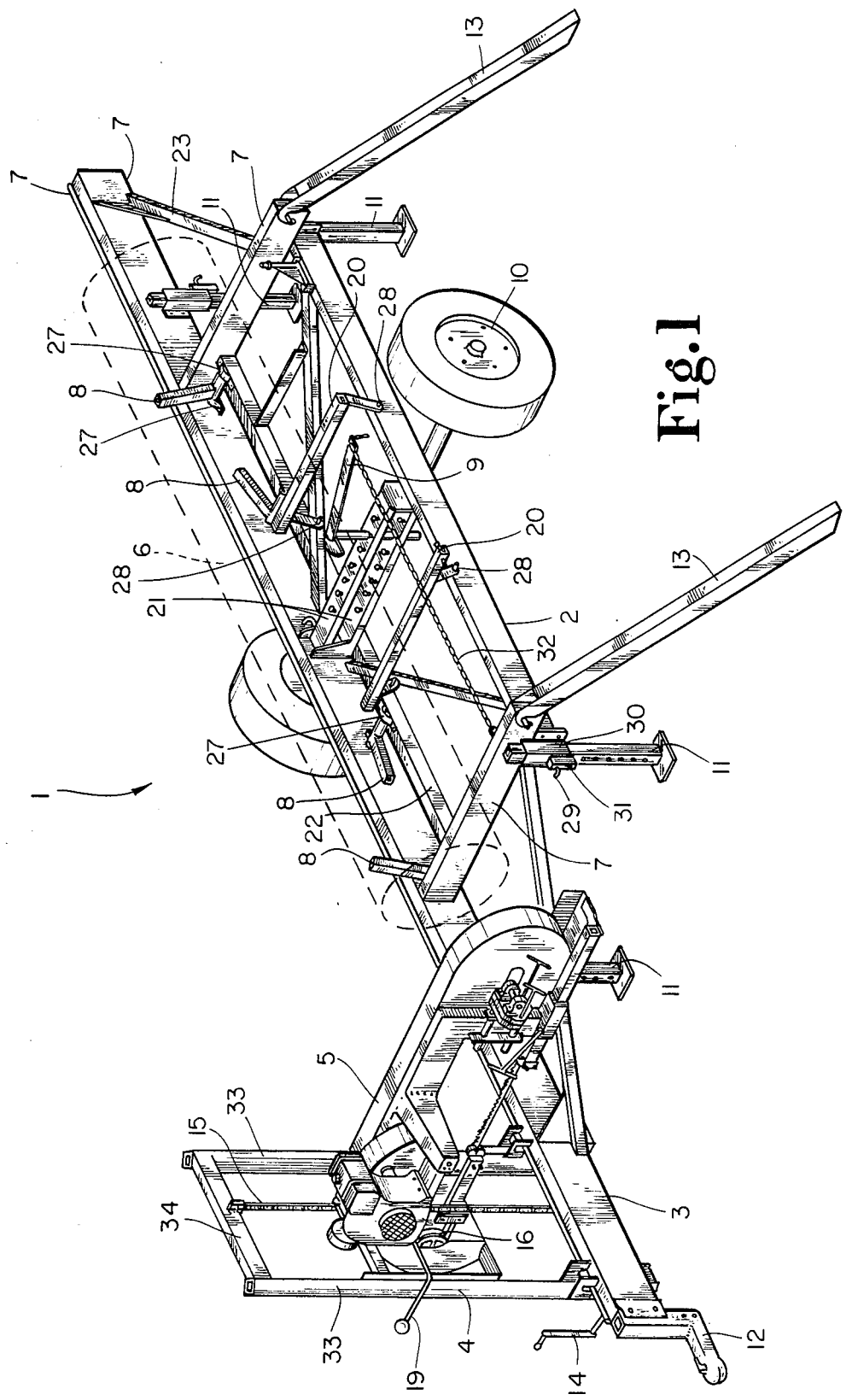
FIG. 1 is a view in perspective of a portable sawmill in its most portable form made like the invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to the drawings, 1 generally indicates a portable sawmill of the preferred embodiment in its most portable form best shown in FIG. 1. This invention features a base frame 2 incorporating a rigid unitized tubular track 3 along which a carriage 4 traverses. The carriage 4 supports a cantilevered horizontal power driven band saw 5 that is adjustable vertically in said carriage 4. The term cantilevered is used herein to indicate that the band saw is mounted to the unitized track on only one side of the log to be cut. The band saw 5 makes a horizontal cut in a log 6 which rests on bed rails 7 and is held in place by its own weight or by stops 8 and locking dog 9 as the carriage 4 traverses the track 3 by mechanically controlled means 14.

Different board sizes are achieved by raising or lowering the band saw 5 in a carriage 4 through mechanical means 15 before each cut.

Figure 2:
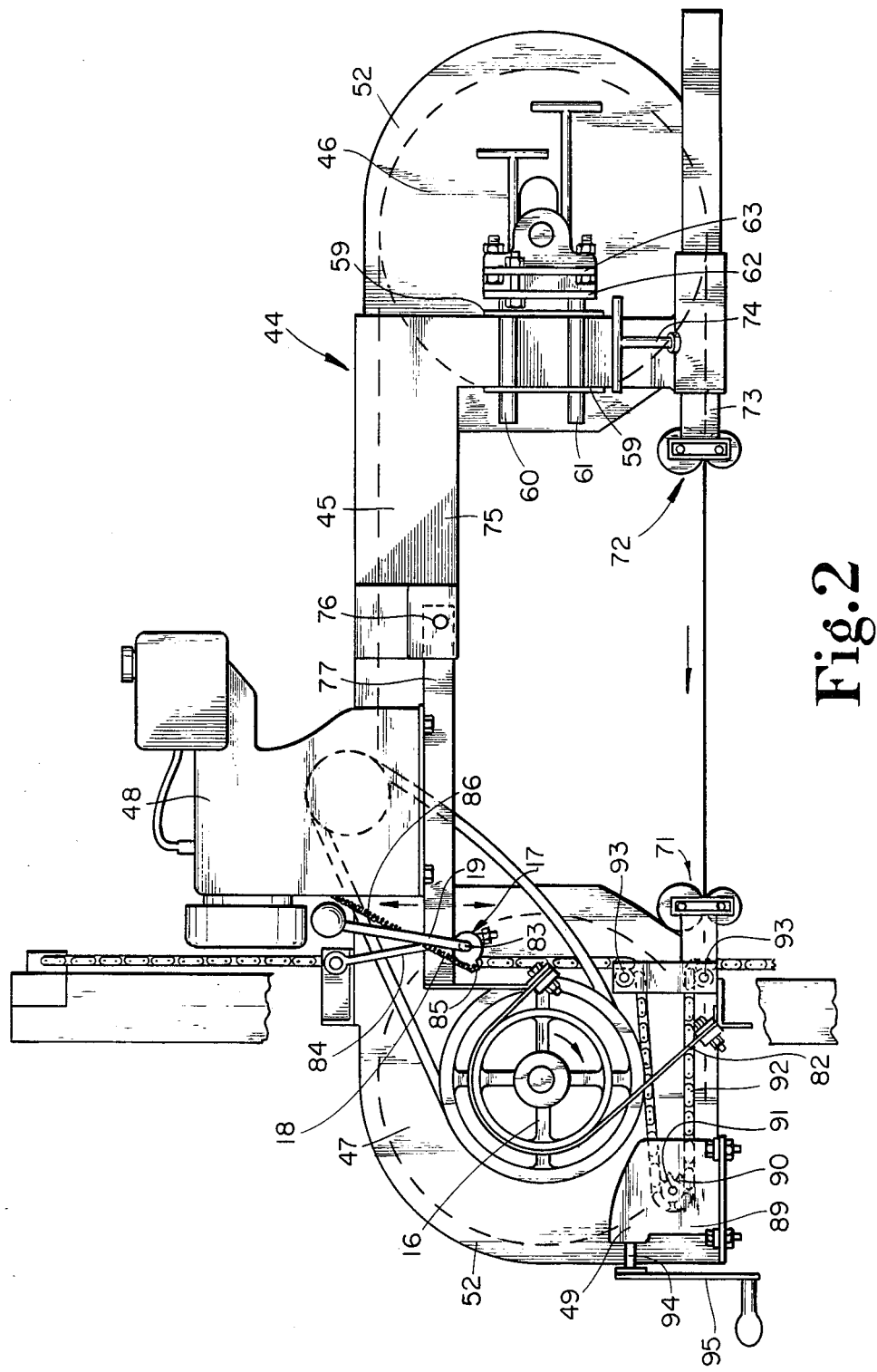
FIG. 2 is a side elevation of the band saw carriage and the horizontal band saw.
Figure 3:
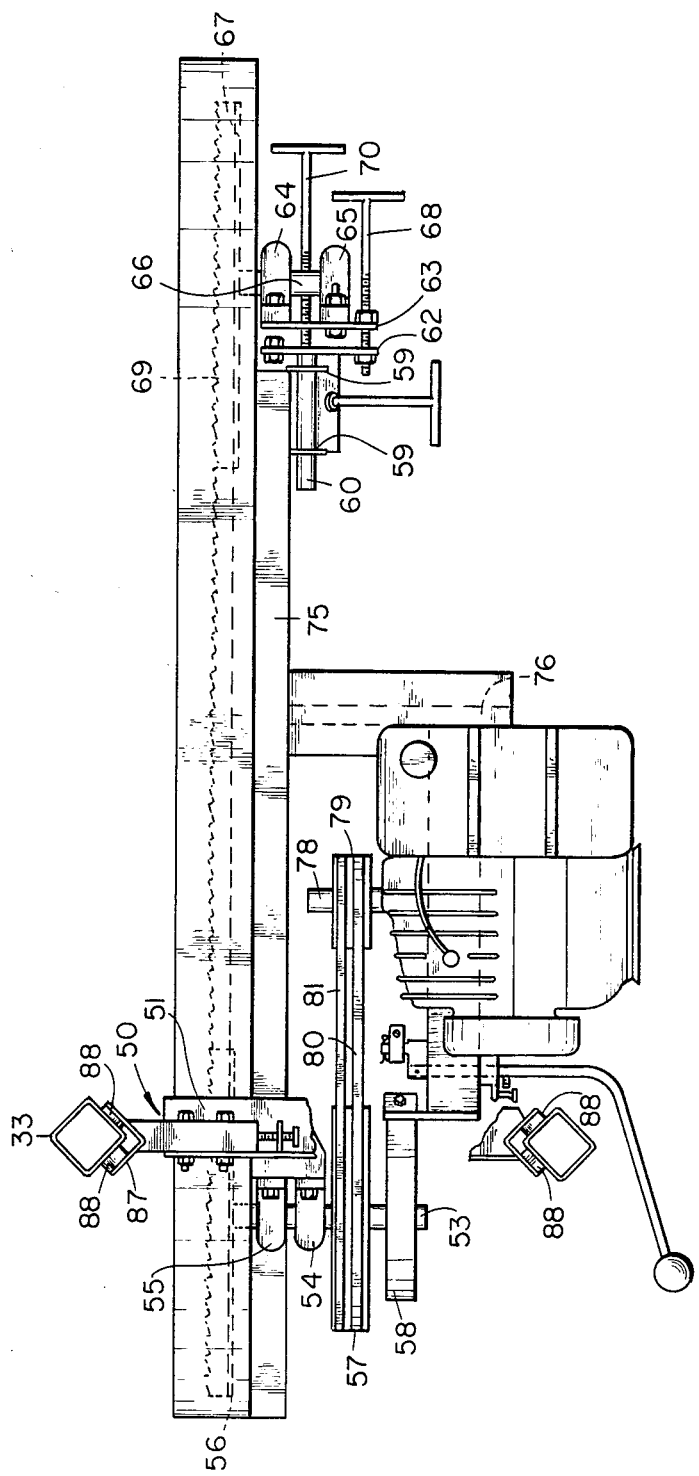
FIG. 3 is a top plan view of the saw carriage and horizontal band saw.

Referring to FIG. 2, safety to the operator is provided by incorporating a brake 16, clutch 17 and power speed control 18 into a single lever 19 which is actuated at the end of each cut to stop the band saw blade and to lower or stop power velocity.

The base frame 2 provides means to attach axle and wheels 10, outriggers 11, trailer hitch 12, and loading ramps 13 making the invention mobile when desired. In its mobile form the invention becomes a means for the transportation of cut lumber or logs.

Figure 4:
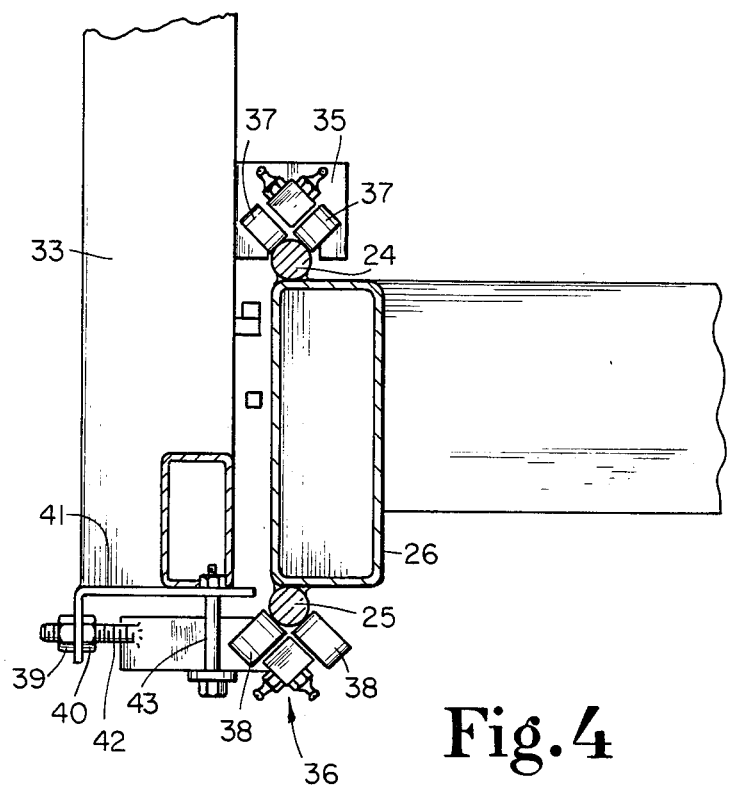
FIG. 4 is a section of the unitized track with carriage mounted.

The base frame of the invention is comprised of a unitized track 3, pivotable log stop 8, mainbed rails 7, auxiliary bed rails 20, locking dog 23 and diagonal reinforcement. These base frame parts are attached to each other by weldment and fabricated from steel tubing to provide rigidity and twist resistance. The unitized track 3 is fabricated from perhaps 3"×8"×20' long structural tubing with perhaps 1" diameter hardened steel rods 24 and 25 welded to the top and bottom of the structural tubing 26, as best shown in FIG. 4. These dimensions are for example only and may be changed as necessary. The main rails 7 made from perhaps 2"×6" tubing are attached perpendicular to the tubing 26 of the unitized track 3. The lower longitudinal rail 22 fabricated from perhaps 2'×6' tubing is attached to main rails 7 and provides a parallel support frame to the track 3 and gives support in its mobile form. The locking cam dog receptacles 21 made from perhaps 4" channel provide holes to insert the locking dog 9 and are attached to the track 3 and lower rails 7. The pivotable log stops 8 are held in place by friction provided by clamping halves 27. The auxiliary bed rails 20 used mainly for short logs can be lowered out of the way by rotating them down about pins 28.

In its most mobile form outriggers 11 are attached to the base at perhaps four places. These outriggers are adjustable up and down by means of a telescopic tube arrangement. A pull pin 29 is in the outer tube 30 and engages holes in the outrigger 11. A second clearance hole 31 is in the outer tube 30 in which a rod can be used to lever the outrigger up or down. Ramps 13 may be attached to the main bed rails 7 or auxiliary rails 20 to provide for rolling the log on the base frame.

In normal mobile use the invention would be towed to the logs, outriggers 11 would be lowered and pinned, ramps 13 would be hooked to the bed rails 7, and a minimum of two log stops 8 would be rotated up. The log 6 would then be rolled up the ramps 13 and onto a minimum of two bed rails until it rests against the log stops the locking dog 9 would then be inserted into a receptacle hole close to the log and rotated until the cam on the locking dog wedges against the log. A chain 32 attached to the bed rail 7 on one end is then inserted in a notch in the handle of the locking dog to keep the locking dog from coming loose. The log is now ready for cutting.

The carriage 4 is comprised of two vertical square tubes 33 and two horizontal rectangular tubes 34 attached to each other by weldment to form a rectangular box shape. The vertical square tubes 33 are attached so that their inside corners become a "V" shaped vertical track. Attached to each vertical tube 33 near the bottom are roller assemblies 35 and 36 which traverse the base frame track 3.

Roller assembly 35 consists of two rollers 37 at perhaps 90° to each other designed so the outer surfaces of the rollers 37 ride on the track 24. The lower roller assembly 36 also includes rollers 38 which ride on the track 25 and are adjustable for track tightness and alignment.

Alignment is accomplished by adjusting the two nuts 39 and 40 with respect to a plate 41 of the carriage 4 between them. The nut 39 turns on a threaded rod portion 42 secured to the lower roller assembly 36 and the nut 40 is tightened to plate 41. The tightness of the carriage 4 to the track is accomplished by tightening or loosening bolt 43 which deflects the lower roller mount up or down. The cantilevered, horizontal, power driven two wheel band saw 44 incorporates a main frame 45 which acts as a base for attaching band saw assemblies 46 and 47, power assemblies 48 and 49 and the "V" track 50 which mates to the "V" shaped track 33 of the carriage 4. The main frame 45 comprises a weldment of several different size tubular shapes and structures in a basic inverted "C" configuration with a vertical rectangular box shape perpendicular to the inverted "C" shape at one end. At the top of the inverted "C" is a horizontal structural support 51 perpendicular to the "C" frame. Attached to one side of the main frame 45 by weldment are guards 52 for the band saw wheels and blade. At one end of the main frame 45 the drive shaft 53 is attached by means of bearing blocks 54 and 55. The drive band saw wheel 56 is attached to the drive shaft 53 on the saw guarded side of the main frame 45 and belt drive sheave 57 and brake drum wheel 58 to the other side. At the opposite end of the main frame 45 is a horizontal telescopic type receptacle 59 in which a sliding shaft assembly telescopes the sliding shaft assembly consisting of two telescopic rods 60 and 61 attached to a stationary plate 62. A second plate 63 is attached to stationary plate 62 by bolts and washers which also mount a bearing block 64 to the second plate and acts as a pivot point between the two plates. A second bearing block 65 is attached to second plate 63 with the driven shaft assembled through both bearing blocks so that the driven band saw wheel 67 is attached to the shaft on the saw guarded side. A screw and nut arrangement 68 acts as a tilt handle to deflect the second plate at the pivot point by squeezing together the back of the stationary plate 62 and the second plate 63. This allows the driven shaft alignment to keep the band blade 69 on the band saw wheels 56 and 67. A second screw and nut arrangement 70 force the driven shaft 66 away from the main frame 45 thereby tightening the band blade 69.

A stationary set of blade guide wheels 71 guide the blade 69 on the lower drive side of the main frame 45. A movable set of blade guides 72 are on the driven side of the main frame 45 and attached to a telescopic guarded tube arrangement which allows adjustment of the exposed cutting section of the blade 69. A screw and nut "T" handle 74 allow tightening of the guarded telescopic assembly 73.

At the middle of the main frame 45 attached to the horizontal structural support 75 by a pivot pin 76 is one end of the motor mount 77. The motor mount consists of a pivotable horizontal structure 77 whereby a drive motor 48 is mounted. In its mobile configuration a gasoline engine of perhaps 14 H.P. is desirable. Attached to the drive shaft 78 of the motor 48 is a drive belt sheave 79. When the motor mount 77 is pivoted up, the distance between the motor drive belt sheave and the belt drive sheave 57 increase.

Belts 80 and 81 between the sheaves tighten and act as a clutch engagement. A strap 82 attached at one end to the main frame 45, wrapped around the brake drum 15 and attached at the other end to an arm of the motor mount moves up and becomes loose around the outside of the brake drum 16. When the motor mount 77 is pivoted down the clutch, the belts 80 and 81 become loose effectively disengaging the clutch 17 and the strap 82 gets tight around the brake drum 16. The weight of the motor mount 77 and motor 48 provide enough downward force on the strap 82 to effectively stop rotation of the brake drum 16 by friction and ultimately stop the band saw blade 69.

The pivoting action of the motor mount 77 is accomplished through a lever 19 attached to the end of the motor mount 77. The lever 19 has an eccentric pin 83 at one end which is attached to the main frame 45 by a connecting rod 84 which is adjustable to compensate for belt wear. The lever 19 also has an arm 85 attached to the motor speed control by an extension spring 86. In actual operation when the lever is rotated from the top position downward, the motor speed increases because of pulling on the extension spring 86, the brake 16 disengages and the clutch 17 engages.

The vertical box shape of the main frame 45 is constructed of angles in a "V" shape that mates to the "V" shape of the carriage 4 acting as a carriage track follower. One of the "V" shaped angles 87 is bolted to the main frame 45 to allow adjustment of the "V" track. They also have sliding bearing pads 88.

Attached to the main frame 45 is a gear box 89 with a sprocket 90 on the output shaft 91. The chain 92 is attached to the carriage 4 at top and bottom and is routed around the gear box sprocket 90 by rollers 93 attached to the main frame 45 of the horizontal band saw 44. When the input shaft 94 of the gear box 90 is rotated by hand crank 95 or motor (not shown), the output sprocket 90 rotates and raises or lowers the horizontal band saw 44 in the carriage assembly 4.

Figure 5:
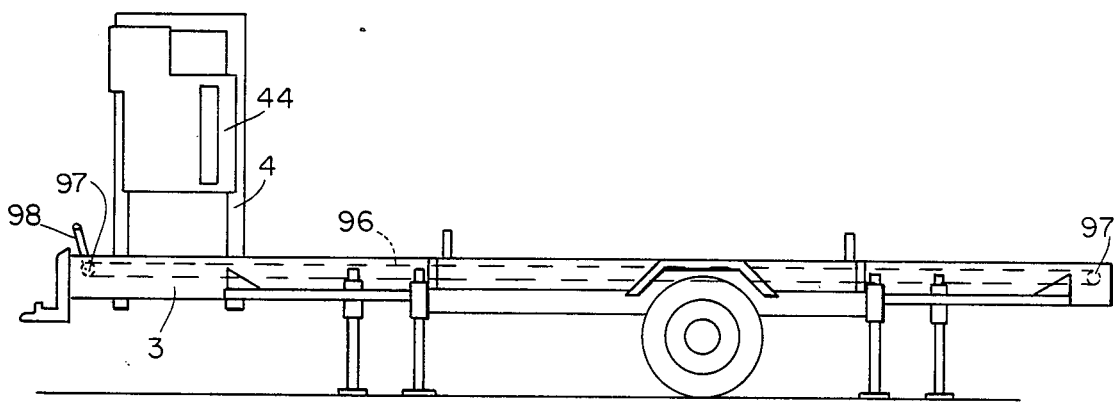
FIG. 5 is a side view of the invention showing carriage drive layout.

The carriage 4 with band saw 44 traverses the track 3 through means of a continual chain 96 and sprocket drive best seen in FIG. 5. At the end of the track is a sprocket 97, one driven by a hand crank 98, with the chain 96 going around the sprockets and attached to the carriage. In operation, the hand crank 98 is rotated and controls the lateral movement of the carriage 4 and band saw 44.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, various modifications of the described invention may be made. A typical modification would be the provision of motor drives for certain of the actions of the unit, such as feeding of the carriage horizontally along the frame, or moving of the band saw vertically on the carriage. These and other such modifications fall within the spirit of the invention, as set forth in the claims, and are therefore considered to be covered hereby.

What we claim is:

1. A portable bandsaw sawmill apparatus comprising an elongated frame, a track extending horizontally along only one side of the frame, a carriage including a support structure, first means for movably mounting the carriage on the track for horizontal movement therealong, a bandsaw having at least two wheels and a bandsaw blade entrained on the wheels, the bandsaw blade comprising a continuous band having transversely extending teeth, the frame including means for supporting a log, means for moving the carriage along the track, second means which cooperates with said support structure for mounting the bandsaw on the carriage so that said bandsaw extends cantilevered therefrom and maintaining a portion of the bandsaw blade which cuts the log in a plane substantially parallel to the frame supporting the log.

2. The apparatus of claim 1 wherein the log support means includes two log supports rigidly attached to the frame.

3. The apparatus of claim 1 and further including control means for controlling the bandsaw.

4. The apparatus of claim 3 wherein the control means includes means for controlling engagement of the bandsaw, for braking the bandsaw, and for controlling engine throttle of an engine powering the bandsaw.

5. The apparatus of claim 4 wherein the control means is actuated by a single control arm.

6. The apparatus of claim 1 and further including wheels for supporting the frame to permit the frame to be moved over a surface.

7. The apparatus of claim 1 wherein the second mounting means includes means for moving the bandsaw substantially vertically with respect to the frame.

8. The apparatus of claim 1 wherein the single horizontal track comprises a unitized tubular track having a top surface, a bottom surface, a first rod mounted on the top surface and extending horizontally thereon, and a second rod mounted to the bottom surface and extending horizontally thereon and parallel to the first rod.

9. The apparatus of claim 8 wherein the second mounting means includes a top roller assembly mounted to the carriage for riding against the top rod and a bottom roller assembly mounted to the carriage for riding against the bottom rod.

10. A portable bandsaw sawmill apparatus comprising an elongated frame including means for supporting a log in a plane, a single rail extending horizontally along one side of the frame and the log, a carriage including a support structure, a bandsaw having a pair of wheels with a bandsaw blade entrained thereon, the bandsaw blade comprising a continuous band having transversely extending teeth, means which cooperates with said support structure for mounting the bandsaw to the carriage so that said bandsaw extend cantilevered therefrom, means for mounting the carriage only on the single rail for horizontal movement therealong, and means for moving the carriage horizontally along the single rail, the bandsaw extending cantilevered over the frame from the carriage such that a portion of the bandsaw blade which cuts the log moves transversely through the log in a plane parallel to the plane in which the frame supports the log as the carriage moves along the single rail.

11. The apparatus of claim 10 wherein the single rail comprises a unitized tubular track having a top surface with a first rod mounted thereon which extends horizontally therealong, and a bottom surface having a second rod mounted thereon which extends horizontally therealong parallel to the first rod.

12. The apparatus of claim 11 wherein the second mounting means includes a top roller assembly mounted to the carriage for riding against the top rod and a bottom roller assembly mounted to the carriage for riding against the bottom rod.

13. The apparatus of claim 10 wherein one of the bandsaw wheels is a bandsaw blade drive wheel and the other wheel is an idler wheel, the bandsaw further including a motor for driving the blade drive wheel, means for coupling the motor to the blade drive wheel, and means for controlling the motor and motor-to-blade drive wheel coupling means to adjust motor speed, to provide for blade braking, and to selectively couple the motor to the blade drive wheel to engage and disengage the motor with the blade drive wheel.

14. The apparatus of claim 13 wherein the control means is actuated by a single lever.

15. A portable bandsaw sawmill comprising an elongated frame for supporting a log in a plane, track means extending along one side of the frame, a carriage, means for mounting the carriage on the track means for movement therealong, a bandsaw having at least two wheels and a bandsaw blade entrained on the wheels, the bandsaw blade comprising a continuous band having transversely extending teeth, means for moving the carriage along the track, means for mounting the bandsaw on the carriage to maintain a portion of the bandsaw blade which cuts the log in a plane over the frame supporting the log, the mounting means for the bandsaw and carriage being constructed such that the bandsaw is cantilevered outwardly over the log and movably supported in such cantilevered fashion only on said track means.

16. The apparatus of claim 15 wherein the track means comprises a unitized tubular track having a top surface with a first rod mounted thereon which extends horizontally therealong, and a bottom surface having a second rod mounted thereon which extends horizontally therealong parallel to the first rod.

17. The apparatus of claim 16 wherein the carriage mounting means includes a top roller assembly mounted to the carriage for riding against the top rod and a bottom roller assembly mounted to the carriage for riding against the bottom rod.

18. The apparatus of claim 15 wherein one of the bandsaw wheels is a bandsaw blade drive wheel and the other wheel is an idler wheel, the bandsaw further including a motor for driving the blade drive wheel, means for coupling the motor to the blade drive wheel, and means for controlling the motor and motor-to-blade drive wheel coupling means to adjust motor speed, to provide for blade braking, and to selectively couple the motor to the blade drive wheel to engage and disengage the motor with the blade drive wheel.

19. The apparatus of claim 18 wherein the control means is actuated by a single lever.

* * * * *

UNITED STATES PATENT AND TRADEMARK OFFICE
CERTIFICATE OF CORRECTION

PATENT NO. : 4,559,858
DATED : December 24, 1985
INVENTOR(S) : Donald R. Laskowski and Daniel R. Tekulve It is certified that error appears in the above-identified patent and that said Letters Patent is hereby corrected as shown below:

Column 1, line 10, after "conventional" insert --portable--;

Column 1, line 16, delete "normally" and insert therefor --may--;

Column 1, line 19, after "These" insert --portable--;

Column 1, line 21, after "mills" insert --may--; and

Column 2, line 52, delete "2' X 6'" and insert therefor --2" X 6"--.

Signed and Sealed this

Eighth Day of April 1986

[SEAL]

Attest:

DONALD J. QUIGG

Attesting Officer

Commissioner of Patents and Trademarks